PORTING FOR BALANCED HYDRAULIC ROLLER PUMP

Original Filed Jan. 3, 1967 4 Sheets-Sheet 1

INVENTORS.
Carl H. Pace, Jr.
Christopher Nuss
Talburtt & Baldwin
ATTORNEYS.

PORTING FOR BALANCED HYDRAULIC ROLLER PUMP

Original Filed Jan. 3, 1967 4 Sheets-Sheet 2

INVENTORS.
Carl A. Pace, Jr.
Christopher Nuss.
Talburtt & Baldwin
ATTORNEYS.

PORTING FOR BALANCED HYDRAULIC ROLLER PUMP

Original Filed Jan. 3, 1967 4 Sheets-Sheet 3

INVENTORS.
Carl A. Pace, Jr.
Christopher Nuss.
Talbutt & Baldwin
ATTORNEYS.

PORTING FOR BALANCED HYDRAULIC ROLLER PUMP

Original Filed Jan. 3, 1967 4 Sheets-Sheet 4

INVENTORS.
Carl A. Pace, Jr.
Christopher Nuss
Talbott & Baldwin
ATTORNEYS.

United States Patent Office

Re. 27,241
Reissued Dec. 14, 1971

27,241
PORTING FOR BALANCED HYDRAULIC ROLLER PUMP

Carl A. Pace, Jr., and Christopher Nuss, Warren, Mich., assignor to Chrysler Corporation, Highland Park, Mich.

Original No. 3,374,749, dated Mar. 26, 1968, Ser. No. 606,934, Jan. 3, 1967. Application for reissue Feb. 24, 1970, Ser. No. 13,563
Int. Cl. F04c *1/00*
U.S. Cl. 418—225 22 Claims

Matter enclosed in heavy brackets [ ] appears in the original patent but forms no part of this reissue specification; matter printed in italics indicates the additions made by reissue.

ABSTRACT OF THE DISCLOSURE

Rollers carried within the circumferential notches in a pump rotor ride along an out-of-round cam surface to pump fluid from radially outer and inner inlet ports associated with inlet cam arcs of increasing radius) to radially outer and inner outlet ports associated with outlet cam arcs of decreasing radius. The outer inlet ports are restricted and open axially into radially outer portions of the notches subsequently to the axial opening of the inner inlet ports into the notches at locations radially inwardly of the rollers, the latter opening being subsequent to appreciable movement of the rollers along the inlet cam arcs, thereby to effect a gradual fluid pressure rise in the rotor notches and a radial pressure gradient enhancing roller stability within the inlet cam arcs. The inner outlet ports discharge high pressure fluid axially from the notches and are arranged to exert unbalanced fluid pressure force axially in one direction on the ends of the rollers as they move along approximately the trailing thirds of the outlet cam arcs, thereby to end load these rollers and enhance their stability.

Related patents and applications

Halsey Patents Nos. 3,236,566 and 3,247,803; Halsey copending application Ser. No. 501,450, filed Oct. 22, 1965; Brady and Nuss applications Ser. No. 598,236, filed Dec. 1, 1966, and Ser. No. 598,426, filed Dec. 1, 1966 (mailed to the Patent Office Nov. 30, 1966).

*The Halsey application Ser. No. 501,450 issued as Patent No. 3,359,913 on Dec. 26, 1967. The Brady and Nuss applications Ser. Nos. 598,236 and 598,426 issued respectively as Patent No. 3,426,785 on Feb. 11, 1969, and Patent No. 3,415,266 on Dec. 10, 1968.*

Background and summary of the invention

This invention relates to hydraulic pumps and in particular to improved means for supercharging the flow of fluid into the inlet ports of a balanced rotary pump, especially a roller pump for automobile power steering, having paired oppositely disposed inlet ports and similarly arranged outlet ports, although some of the advantages of the present invention are obtainable with other types of pumps.

As vehicle speeds have increased, emphasis has been placed on the economical production of high-speed and high-pressure engine driven automotive power steering pumps, along with greater pump efficiency and reliability. A significant problem in the development of such pumps, particularly of the roller type, has resulted from cavitation in the pump inlet system, with resultant noise and inefficiency. The problem of cavitation becomes particularly difficult at high pump speed even at comparatively low output pressure, and at high output pressure even at moderate or intermediate pump speed.

An important object of the present invention is to provide a balanced rotary hydraulic pump having a pair of diametrically opposed inlet ports spaced by a pair of diametrically opposed outlet ports, in cooperation with a bypass valve arranged to receive excess fluid discharged from the outlet ports and to direct this fluid via a bypass duct into the upstream end of the pump inlet or fluid supply passage. The latter extends in the direction of rotor rotation circumferentially around the axis of the rotor from a first of the pair of inlet ports to the second to supply fluid thereto in succession. The bypass duct is designed in accordance with well-known venturi principles and is provided with an aspirator type fluid make-up port in communication with a reservoir, so that as the speed of bypass flow in the bypass duct increases (in consequence of increased pump speed or pump outlet pressure) the tendency to aspirate fluid into the bypass duct from the reservoir via the make-up port also increases. Thus a supercharging of fluid into the circumferential supply passage and hence into the inlet ports will increase with either increasing pump speed or outlet pressure.

Because of the trend toward ever decreasing under-the-hood space for the modern automobile, compactness in the power steering pump as well as economy of manufacture and installation are paramount considerations. It is accordingly another object to provide such a pump characterized by its compactness and economy of material, fabrication and assembly, in relation to its rated output, yet which is particularly quite and efficient in operation under all the varied and extreme conditions to which an automotive high-pressure power steering pump is normally subjected.

A specific object in accordance with the foregoing is to provide an improved balanced pump of the above character comprising a housing containing a cylindrical cam ring having an inner out-of-round cam surface. A cylindrical rotor mounted within the cam ring cooperates with the latter's inner cam surface to provide a pair of diametrically spaced inlet chambers and another pair of diametrically spaced discharge or chambers associated respectively with corresponding pairs of inlet arcs of increasing radius and outlet arcs of decreasing radius at the inner surface of the cam. The rotor is provided with a plurality of circumferentialy spaced and radially opening notches extending axially in its periphery, which carry a corresponding plurality of radially and axially shiftable pumping elements such as rollers in fluid pumping and sealing engagement with the inner cylindrical surface of the cam, the latter also comprising separate constant radius seal and dwell arcs spacing inlet and outlet arcs.

The cam ring is confined between a pair of plates comprising part of the housing and defined herein as a front plate and a pressure plate between which the rotor is freely rotatable. A separate pair of radially spaced inlet ports communicate axially with each of the inlet chambers to supply supercharged inlet fluid thereto, these inlet portst being provided in the front and pressure plates and being in turn connected with an inlet header extending coaxially around approximately three-fourths of the outer circumferential surface of the cam ring from one of the inlet ports to the other. Similarly, a separate pair of radially spaced outlet ports extending axially through the pressure plate communicate axially with each of the discharge chambers. A corresponding pair of high pressure balancing ports or recesses are provided in the front plate axially opposite each pair of discharge ports and in communication with the corresponding discharge or pumping chamber. The axially opposed inlet ports have equal areas exposed to the rollers and rotor to balance the axial fluid pressures thereon. For the same purpose the high pressure balancing recesses have areas substantially equal to the areas of the axially opposed discharge ports. However, one or the other of the balancing or discharge ports associated with each outlet arc of decreasing radius is elongated circumferentially in the direction of rotation beyond the circumferential extent of the axially opposite balancing or discharge port, and is in communication with the juxtaposed axial ends of the roller pumping elements to effect an unbalanced axial pressure force on these rollers. The unbalanced pressure force is preferably applied in the trailing part of each outlet arc and has been found when thus applied to be effective in stabilizing the rollers so as to reduce pump noise and wear during operation.

Other problems apparently associated with cavitation at the pump inlets are those of stabilizing the pumping rollers and maintaining the same in proper fluid sealing engagement with the rotor and cam surface, particularly throughout the inlet arc of increasing radius. In conventional pumps, as the roller is carried along the inlet arc by rotation of the rotor, each roller tends momentarily to float ahead of its driven engagement with the trailing edge of its rotor notch as the roller enters a transition region between the high outlet pressure and the comparatively low inlet pressure, then snaps back into its driven engagement with the rotor notch upon continued rotation of the rotor. Also during this period, the roller tends to leave the inlet arc cam surface by virtue of the latter's increasing radius. Rotor stability and the fluid seal between the high pressure and low pressure portions of the pump are impaired, pump efficiency is reduced, and noise results when the rollers again engage the cam surface and the trailing edge of the rotor notch. These difficulties are most critical in a balanced pump having two inlet arcs, wherein the transition pressure region and "rise" or increase in radius must necessarily occur within a comparatively short arcuate distance, and are emphasized by the viscosity of the fluid being pumped, among other factors presumably including localized fluid pressure and turbulent conditions acting on the roller.

Other objects accordingly are to provide improved means in a pump of the above character for maintaining the roller in positive sealing engagement with the cam surface as required throughout the inlet arc, and in particular to provide improved means including the inlet porting for applying the pressure of the supercharged inlet fluid against the rollers so as to achieve roller stability and sealing engagement with the rotor notch and cam surface at the inlet arc.

Other objects of this invention will appear in the following description and appended claims, reference being had to the accompanying drawings forming a part of this specification wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Description of preferred embodiment

Figure 3:
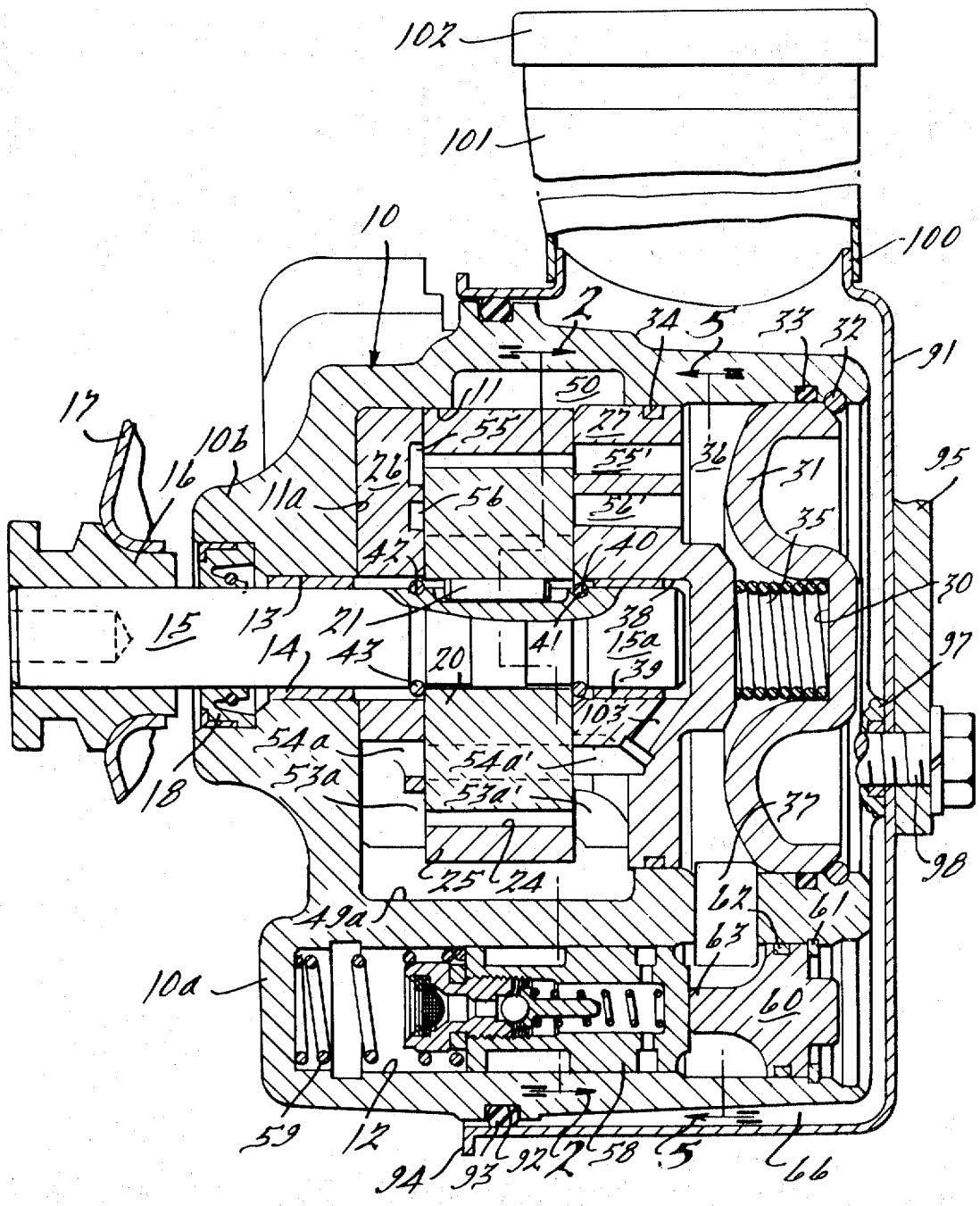
FIGURE 3 is a sectional view through the rotor and bypass valve taken substantially in the direction of the arrows along the broken line 3—3 of FIGURES 1 and 2.

Referring to the drawings a particular embodiment of the present invention is illustrated by way of example in a high pressure automobile power steering pump comprising a generally cup-shaped cast steel housing 10 open at its right end, FIGURE 3, to provide a circularly cylindrical pump chamber 11. The housing 10 provides an integral lower enlargement 10a containing an axially extending valve chamber 12 of circular cross-section also opening endwise in the same direction as the chamber 11. The left end of the housing 10 comprises a thickened hub 10b and a bore 13 coaxial with chamber 11 and containing an annular bearing 14 for a rotor shaft 15. The present pump has several features common to the pump described in Halsey Patents Nos. 3,236,566 and 3,247,-803 and in the Halsey co-pending application, Serial Number 501,450, filed October 22, 1965, all assigned to applicants' assignee, and reference thereto is hereby made for a possible better understanding of such features.

The outer end of the shaft 15 is connected to a hub 16 of a pulley 17 operatively connected with the automobile engine, as for example by means of a pulley belt, whereby the shaft 15 is rotated in accordance with engine speed to operate the pump. From the hub 16, the shaft extends inwardly through a seal 18 into chamber 11 and is secured therein to a rotor 20 by means of a key 21, whereby the rotor 20 rotates with shaft 15 and is freely slidable axially thereon. The circumference of the rotor 20 is provided with twelve uniformly spaced, axially extending and radially opening slots or notches 22, each containing a cylindrical roller 23. The sides of each notch 22 diverge radially outwardly from a width measured circumferentially less than the diameter of the roller 23 to a width greater than the roller diameter, so as to enable each roller to move freely radially within the corresponding notch 22 during operation of the pump as explained below.

The rollers 23 are restrained against radial movement by the out-of-round inner cylindrical cam surface 24 of a generally annular cam ring 25 having a cylindrical outer surface of circular cross-section coaxial with the rotor shaft 15 and fitting closely and axially slidably within the chamber 11. The rotor 20 and cam ring 25 space a front or base plate 26 from a rear pressure plate 27. The faces of the plates 26 and 27 which confront the cam ring 25 are flush with the juxtaposed faces of the latter and extend perpendicularly to the axis of the rotor 15. In order to allow freedom of rotation of the rotor 20, its axial length in FIGURE 3 is slightly less than the axial length of the ring 25 by approximately .0013" for example. Similarly the axial length of the rollers 23 is approximately equal to the axial length of the rotor 20.

The outer cylindrical surfaces of the plates 26 and 27 fit closely and axially slidably within the chamber 11 and the outer face of plate 26 fits flush against the base 11a of the chamber 11. The plates 26 and 27 cooperate to confine the rotor 20 within a pumping chamber bounded circumferentially by the cam surface 24 and are maintained in circumferential alignment with the ring 25 by means of an axially extending pin 28 which extends snugly through aligned openings in the ring 25 and plates 26, 27 and is confined at its left end within the wall 11a of housing 10.

The rear or endwise opening of the chamber 11 is closed by a plug 31 secured in position by a wire ring 32 partially embedded in the housing 10. Annular O-rings 33 and 34 around the plug 31 and pressure plate 27 respectively prevent axial leakage of high pressure fluid. The plate 27 is urged axially against ring 25 by a coil spring 35 seated within a central pocket 30 in plug 31, thereby to seat the plate 26 against the wall 11a and to seat the ring 25 between the plates 26 and 27 in fluid sealing relationship, which relationship is enhanced by the pressure of the pump discharge fluid contained within a fluid discharge header 36. The latter is located between plate 27 and plug 31 and opens through a high pressure port 37 in the housing 10 into the right end of valve chamber 12. Extending rightwardly from the rotor 20 in FIGURE 3 is a shaft stub end 15a of shaft 15, which projects coaxially into a cup-shaped pocket 38 in plate 27, the pocket 38 containing a bearing 39 for the stub 15a. The base of pocket 38 comprises a seat for spring 35. An annular groove 40 in the shaft 15 adjacent the right edge of rotor 20 carries a wire ring 41 which serves as a retainer to prevent leftward separation of the shaft 15 from the pump assembly. A similar groove 42 and wire ring 43 are provided adjacent the left edge of rotor 20.

Figure 2:
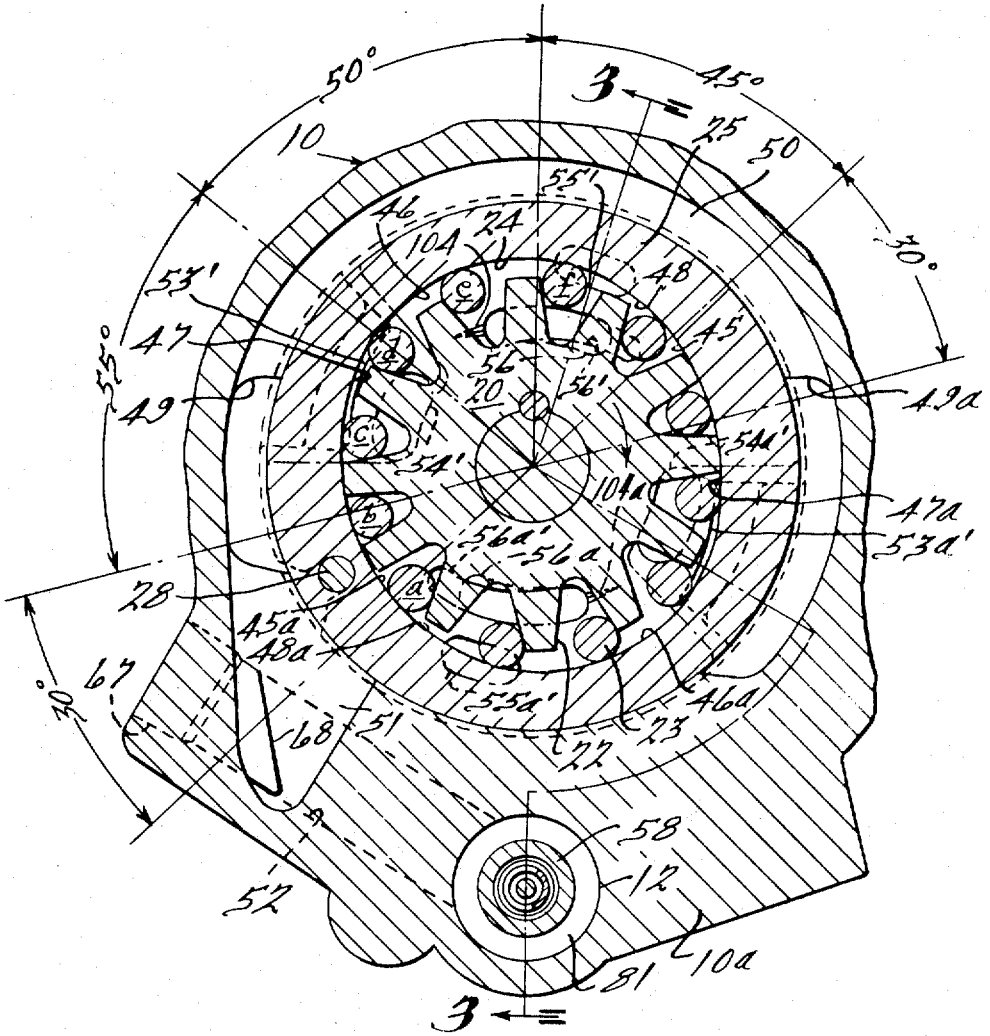
FIGURE 2 is a sectional view taken substantially in the direction of the arrows along the broken line 2—2 of FIGURE 3.

Referring to FIGURE 2, the cam surface 24 comprises a pair of diametrically opposed 30° seal arcs 45 and 45a of constant diameter. Mutually spacing the seal arcs 45 and 45a are another pair of diametrically opposed 50° dwell arcs 46 and 46a of constant radius somewhat larger than the radius of the arcs 45 and 45a. Between each small constant radius seal arc 45 or 45a and the next adjacent large constant radius dwell arc 46 or 46a, measured clockwise in FIGURE 2, is a 55° inlet arc 47 or 47a respectively of gradually increasing radius. Similarly, between each large diameter dwell arc 46 or 46a and the next clockwise adjacent small diameter seal arc 45 or 45a is a 45° outlet arc 48 or 48a respectively of gradually decreasing radius. The terminals of the inlet and outlet arcs merge tangentially with the juxtaposed terminals of the seal and dwell arcs of constant radii, the rate of change of radius for each of the inlet and outlet arcs being slight near the leading and trailing ends of these arcs and gradually increasing to their mid regions, particularly in regard to the inlet arcs 47 and 47a wherein the rate of change of radius is comparatively small along the leading and trailing thirds of the inlet arcs and gradually increases toward the mid-region, such that the rate of change of radius is comparatively large throughout the middle third of the inlet arcs.

At the sectors of the diametrically disposed inlet arcs 47 and 47a, the pump chamber 11 is enlarged to provide a pair of fluid inlet recesses or chambers 49 and 49a respectively, FIGURE 2, which extend axially in the housing 10 at locations adjacent and radially outwardly of plates 26 and 27 and ring 25, as indicated in FIGURE 3, and intersect a circumferentially extending inlet header 50 coaxial with rotor 20. The header 50 extends within the housing 10 at a location radially outwardly of and partially overlapping ring 25 and plate 27 which define its inner wall. The upstream or inlet end 51 of the header 50 communicates with the valve chamber 12 to receive fluid therefrom via a generally tangentially extending bypass duct 52 in the housing 10, FIGURES 2, 4 and 5, as described below.

Opening axially into the pump chamber 11 from the inlet recesses 49 and 49a respectively are a pair of radially outer inlet ports 53 and 53a formed in plate 26. A similar mating pair of outer inlet ports 53' and 53a' are located in plate 27 directly opposite the corresponding ports 53 and 53a. These outer inlet ports open axially toward the rotor 20 and also open radially outwardly into their respective recesses 49, 49a and thus into inlet header 50 to receive inlet fluid, FIGURES 2 and 3, and partially overlap the axial ends of the rollers 23 and the radially outer portions of the rotor notches 22 to supply the latter with fluid as they sweep across the inlet cam arcs 47 and 47a. Radially inwardly of the ports 53 and 53a are a pair of inner inlet ports 54 and 54a formed in plate 26 to receive fluid from inlet recesses 49 and 49a and to discharge the fluid axially into the rotor notches 22 at locations radially inwardly of the rollers 23. Similar inner inlet ports 54' and 54a' are provided in plate 27 to confront rotor 20 directly opposite the ports 54 and 54a respectively. *The ports 53a and 54a in plate 26 are illustrated in FIGURE 3. The corresponding diametrically opposite ports in plate 26 are not illustrated in the drawings, but are identified in the specification by numerals 53 and 54 respectively to simplify description and to facilitate comparison with their counterparts 53' and 54' in plate 27.* The transverse areas of the inlet ports of each axially opposed pair are substantially identical, so as to maintain the rotor 20 and rollers 23 in hydraulic balance. As indicated in FIGURE 2, the radially outer inlet ports 53, 53a, 53' and 53a' are partially restricted with respect to the radially inner inlet ports 54, 54a, 54' and 54a', so as to effect proper timing of the movement of the rollers 23 within their notches 22 and to prevent the rollers 23 from falling away from the rising cam surface 24 during the inlet cycle, as described below.

At the region of the discharge cam arcs 48 and 48a, the pressure plate 27 is provided with a pair of axially extending outer and inner arcuate discharge ports 55', 56', and 55a', 56a', respectively, which discharge into header 36, FIGURE 3. The radially outlet discharge ports 55', 55a' partially overlap the ends of the rollers 23 and the radially outer portions of the notches 22, whereas the radially inner discharge ports 56', 56a' open from the inner portions of the notches 22 radially inwardly of the rollers 23, to receive fluid from the notches 22 upon inward movement of the rollers 23 during operation of the pump. Axially opposite the discharge ports 55', 55a', 56' and 56a' are pressure balancing recesses 55, 55a, 56 and 56a respectively, formed in the surface of plate 26 confronting the rotor 20 to provide areas substantially equal to the corresponding areas of the axially opposed discharge ports in plate 27, so as to maintain the rotor 20 and rollers 23 in hydraulic balance except as explained below.

It is to be noted in the above regard that the inner outlet ports 56' and 56a' in plate 27 extend circumferentially in the direction of rotation appreciably beyond the trailing ends of the mating recesses 56 and 56a in plate 26 and overlap the axial ends of the rollers 27 within the trailing third of the outlet arcs 48 and 48a, FIG. 2, thereby to provide an unbalanced high pressure force axially against these rollers. It has been found that such axial end loading of the rollers in the trailing portion of the outlet arcs of decreasing radius contributes significantly to roller stability in a high pressure balanced roller pump, reducing both noise and wear during high-speed operation. In order to compensate for the circumferential elongation of the ports 56' and 56a', their radial dimensions are reduced, so that their total cross sectional area remains substantially equal to the total cross sectional area of the balancing recesses 56 and 56a. Accordingly the rotor 20 is maintained in hydraulic balance.

Figure 4:
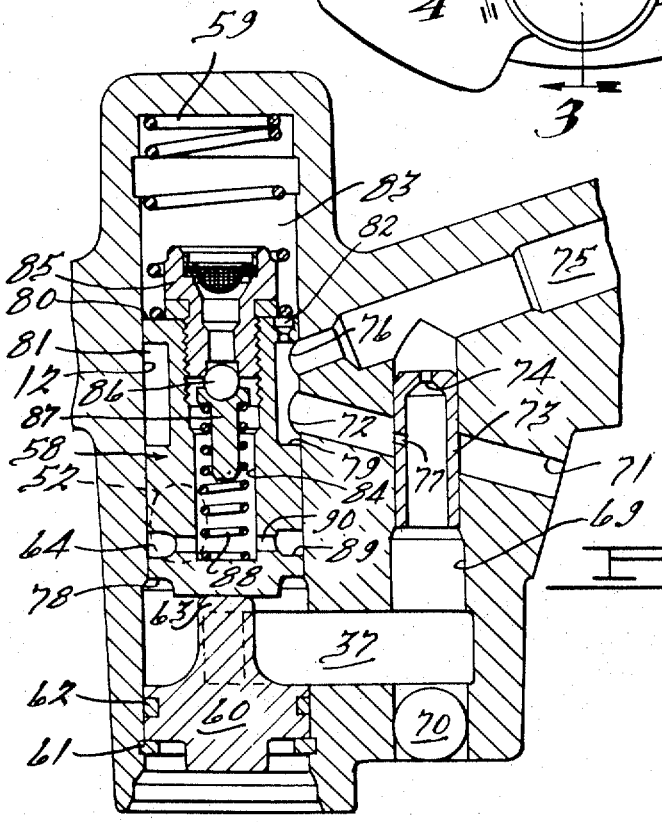
FIGURE 4 is a fragmentary enlarged sectional view through the bypass and safety valves, taken substantially in the direction of the arrows along the line 4—4 of FIGURE 1.
Figure 5:
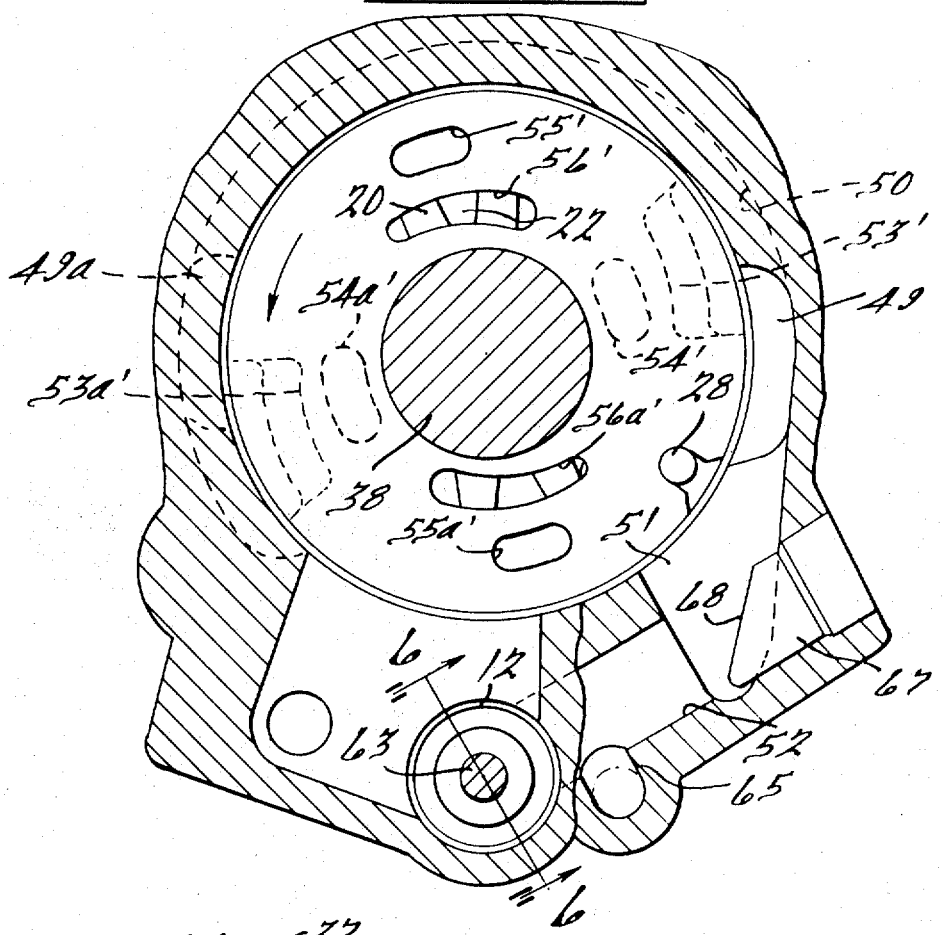
FIGURE 5 is a sectional view taken substantially in the direction of the arrows along the line 5—5 of FIGURE 3, showing details of the back pressure plate.

Slidable axially within valve chamber 12 is a hollow cylindrical slide or spool valve 58 urged rightward against the pump discharge pressure by means of a coil spring 59 seated under compression between the left ends of chamber 12 and valve 58, FIGS. 3 and 4. The chamber 12 comprises a bore extending leftward in housing portion 10a and is sealed by a closure 60, retained in place by a C-ring 61 partially embedded in the housing side wall. A seal 62 around the periphery of the closure 60 prevents endwise leakage of the fluid from the housing enlargement 10a. Extending inwardly as an integral portion of the closure 60 is a stop 63 adapted to limit rightward movement of valve spool 58.

The bypass duct 52 opens into the bore 12 at a bypass port 64 near the upstream end of bore 12 and is connected by means of a fluid make-up duct 65 with a reservoir 66 for supercharging the inlet flow of hydraulic fluid into duct 52. The diameter of the latter is reduced with respect to the diameter of valve bore 12 to comprise a venturi restriction between bore 12 and the enlarged inlet 51 for header 50, FIG. 5. Also the bypass duct 52 comprises a bore into housing enlargement 10a from the right in FIG. 5, the axes of the bores 12 and 52 intersecting at right angles and the remote or outer end of the bore 52 being closed by plug 67 having an inner flow biasing cam surface 68 projecting into the inlet 51 obliquely to the axis of bore 52. Thus the cam element 67, 68 serves both to direct the flow of supercharged fluid radially inwardly and generally tangentially into inlet header 50 and also to close the outer end of the bypass bore 52.

Figure 6:
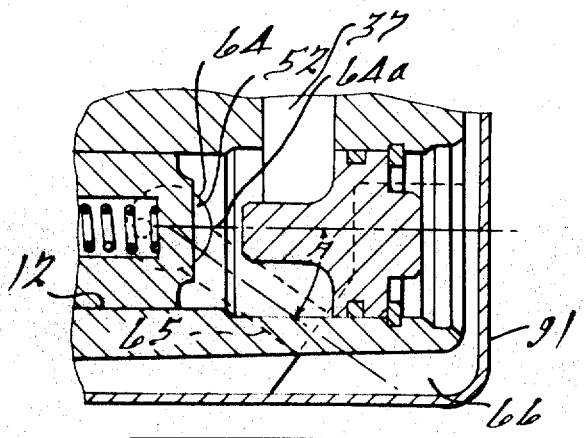
FIGURE 6 is a sectional view taken substantially in the direction of the arrows along the line 6—6 of FIGURE 5, showing the bypass valve in a partially open condition.

As shown in FIG. 6, the axis of make-up duct 65 intersects bypass duct 52 at right angles as closely to bypass port 64 as feasible and converges in the direction of leftward opening movement of spool 58, FIGURE 6, toward a plane containing the axes of both bores 12 and 52. It has been found that if the axis of make-up bore 65 intersects the aforesaid axial plane at an acute angle A, which is preferably slightly less than 45° or approximately 35° as shown, optimum supercharging or acceleration of the make-up fluid entering inlet 51 from reservoir 66 via bores 65 and 52 is achieved when the high pressure fluid discharged from header 36 into valve bore 12 via port 37 causes leftward opening movement of valve spool 58 from the most rightward or trailing edge portion 64a of bypass port 64, FIGURE 6. The make-up bore 65 may enter bypass bore 52 from either side of the aforesaid plane common to the axes of both bores 12 and 52 and at a location centered in the mid-region of the arc between this plane and a normal thereto, but preferably closer to said plane. By virtue of the parallel axes of the rotor 20 and valve 58 and the intersecting axes of the bores 52 and 65 as described, in combination with the biasing cam 68 and inlet header 50 as shown, a particularly compact and efficient pump and supercharging arrangement is achieved.

Figure 1:
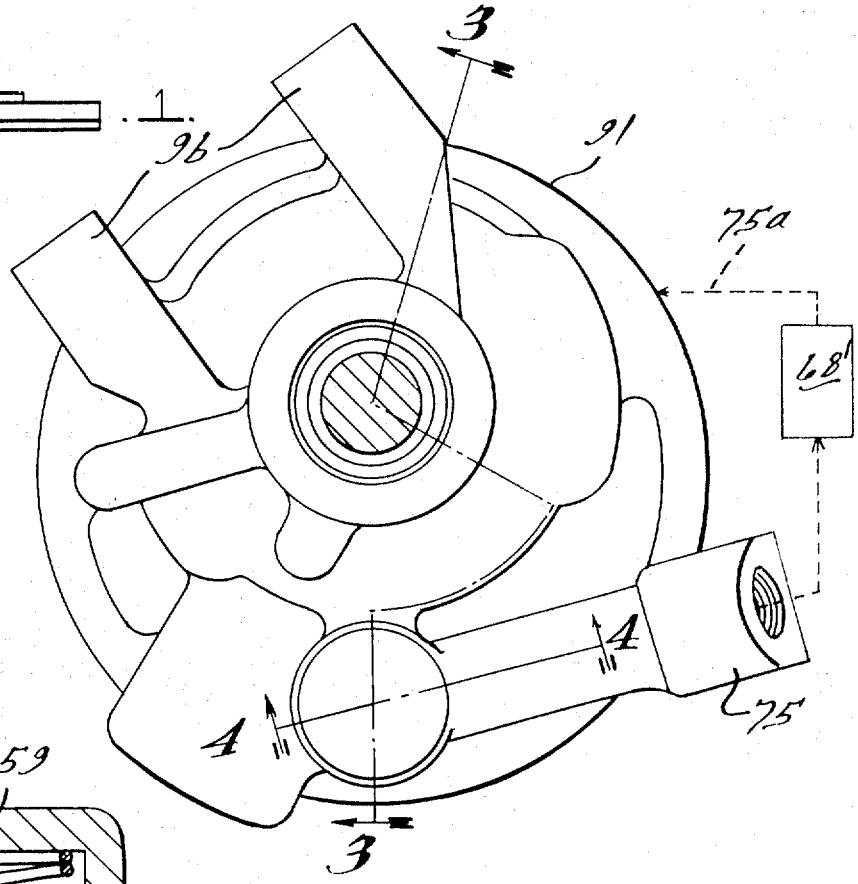
FIGURE 1 is an end elevational view of a pump embodying the present invention.

In order to supply high pressure working fluid at a metered rate to the automobile power steering gear *68'* [68], FIGURE 1, a primary passage 69 for the working fluid is bored into the housing 10a through the valve port 37 to communicate with the latter and to receive the pressurized output fluid from the header 36. The open end of the bore 69 is sealed by a closure 70. A second bore 71 in the housing 10a intersects the bore 69 downstream of the valve port 37 and communicates with the valve bore 12 at a secondary port 72. A tubular fitting 73 extends coaxially within the bore 69 to provide a closure for the radially outer portion of the bore 71 and also to provide a first restricted metering orifice 74 which opens axially endwise into a delivery passage 75. A portion of the latter is bored into the housing 10a and communicates with valve bore 12 at a delivery port 76 downstream of the secondary port 72. The delivery passage 75 extends to the hydraulic motor of the power steering gear *68'* [68] to supply pressurized working fluid thereto in a conventional manner, the exhaust fluid from the motor being discharged via 75a into the reservoir 66 as indicated, FIGURE 1. The tubular insert 73 is also provided with a restricted lateral metering orifice 77 opening into the portion of bore 71 which in turn opens at 72 into the valve bore 12.

The valve spool 58 is provided with an annular bypass land 78 at its upstream end for controlling the communication between the valve port 37 and bypass port 64 in accordance with axial shifting of the spool 58 as described below. Similarly a second annular land 79 of the spool 58 controls the openings of the secondary port 72 into the valve bore 12. An annular third or guide land 80 spaced from the land 79 by an annular recess 81 serves as a guide for the spool 58 in bore 12 and is provided with a restricted trigger orifice 82 extending axially therethrough into a downstream chamber portion 83 of the bore 12. The valve biasing spring 59 seated against the guide land 80 urges the spool 58 rightward against the stop 63 with a substantially constant force within the range of movement permitted.

It is apparent from the construction shown that the high pressure directed against the upstream end surface area of the spool valve 58 is balanced by the combined forces of the spring 59 and the pressure in the downstream chamber 83 against the downstream end surface area of the spool 83, such that a constant pressure differential across orifice 74 is maintained as determined by the force of spring 59. In the event that the pressure differential across metering orifice 74 tends to vary, the valve spool 58 will shift correspondingly to increase or decrease the communication of bypass bore 52 with the valve port 37. In consequence of the constant pressure differential across metering restriction 74, a constant flow of working fluid into the delivery passage 75 and to the gear *68'* [68] will be supplied at all times during operation of the pump at moderate engine speeds as described below, regardless of the pressure in passage 75 determined by the power demands of the gear *68'* [68]. It is also to be noted that a secondary restricted passage through restriction 77, port 72, and port 76 provides a limited bypass flow of the working fluid around the restriction 74 into delivery passage 75 during operation at moderate engine speeds. Obviously the pressure differential across the secondary restricted passage will be the same as the pressure differential across the parallel orifice 74.

In a typical power steering gear the combined flow through restrictions 77 and 74 will be in the neighborhood of approximately 2.7 gals. per minute when port 72 is open as in FIGURE 4. The excess pump output will be bypassed into port 64 upon leftward shifting of valve spool 58. During high speed operation of the vehicle engine and increased pump output, port 72 is closed by land 79 upon leftward movement of spool valve 58. Thus at high vehicle speeds ordinarily above 60 m.p.h. when the power requirement of the gear *68'* [68] are at a minimum, the flow of working fluid into delivery passage 75 is reduced sharply to approximately 1.5 gals. per minute by the closing of the secondary passage through port 72.

During the operation described thus far, there is no fluid flow through trigger orifice 82 except to accommodate transistory shifting of valve 58, whereupon orifice 82 effects a dash-pot action to damp sudden valve movements. Accordingly, the fluid pressure in the downstream chamber 83 will usually be substantially the same as the pressure of the working fluid in delivery passage 75.

In order to prevent the development of an unsafe pressure in the delivery conduit or passage 75 in the event of an excessive power demand by the *gear 68'* [motor 68], a fluid pressure relief system is provided comprising a coaxial bore 84 in the spool 58, which opens into chamber 83. The bore of a tubular valve insert 85 secured within the open end of bore 84 is normally closed at its inner end by a ball check valve 86. The latter is maintained in a seated position against the end of tube 85 to close the bore 84 by means of a spring retainer 87 urged leftward against the ball 86 by a spring 88 seated under compression against a flange of the retainer 87 and the closed right end of bore 84. An annular recess 89 in the outer periphery of spool 58 communicates with the bypass port 64 and is in turn connected with the bore 84 by a plurality of radial bores 90 to discharge fluid from the chamber 83 into bypass port 64 upon opening or unseating of valve 86 against the force of spring 88 in response to pressure at an upper limit in chamber 83.

Upon the unseating of valve 86, a small quantity of fluid will be discharged into bypass 52 through bore 84. By virtue of the restriction of trigger orifice 82, the pressure in downstream chamber 83 will be immediately reduced to enable leftward shifting of valve spool 58, thereby to increase the opening of bypass port 64. In consequence, a comparatively insignificant fluid flow around check valve 86 can result in a comparatively large rate of increase in the by-pass flow around land 78. Reference is hereby made to the aforesaid copending applications of Brady et al. for a more detailed explanation of the structure and operation of the flow control bypass valve mechanism.

The reservoir 66 is defined in part by the exterior of housing 10 and is enclosed by an outer cup-shaped shell or reservoir housing 91 fitted over the rear or right end of the housing 10, FIGURE 3.

Near its front end, the housing 10 has an integral annular seal retaining groove 92 eccentric with respect to rotor 20 and containing an annular O-ring seal 93. The latter is under compression between the juxtaposed portions of the housing 10 and shell 91 to prevent fluid leakage from the reservoir 66. Forwardly of the seal 93, the shell 91 terminates in an outturned reinforcing flange 94.

The pump is pivotally mounted on the vehicle engine by means of a bracket 95 pivotally secured to the engine and bolted to a pair of housing mounts 96 integral with the housing enlargement 10a forwardly of the reservoir shell 74. A portion of the bracket 95 extends around to the rear of the housing 10 and is bolted to boss 97 thereof by means of bolt 98 which extends through the bracket 95 and reservoir shell 91 to clamp these members together. Leakage around the bolt 98 is prevented by an annular seal 99 compressed between shell 91 and portion of the boss 97.

An upper annular flange 100 of the shell 91 defines an opening into the lower end of a cylindrical expansion chamber 101 welded to flange 100. The upper end of chamber 101 is closed by a removable cap 102, whereby hydraulic fluid lost from the system by leakage may be readily replenished. Normally the fluid level will be maintained at approximately the level of the base of flange 100.

High pressure fluid which tends to leak radially from the discharge ports 55', 56', 55a', 56a' and pressure balacing recesses 55, 56, 55a, 56a toward the shaft 15 is conducted from the right end 15a of the latter by a bleed conduit 103 bored in the plate 27 from the inlet port 54a' to the rear end of cylindrical chamber 38, FIGURE 3. Similarly, fluid leaking axially along shaft 15 to seal 18 is returned to the reservoir 66 by means of a suitable bleed conduit formed in the housing 10, so that operation of the pump does not tend to suck air axially inwardly through the seal 18, as for example, into one of the inlet ports. The inner end of the stub shaft 15a may be drained directly to the inlet port 54a' as illustrated because this end is positively sealed from the atmosphere.

In order to effect a smooth transition in the fluid pressure as the low pressure inlet fluid is carried along the seal arcs 46, 46a to the high pressure outlet arcs 48, 48a, the leading edges of the inner discharge ports 56 and 56a are in communication with compression recesses 104 and 104a respectively in the back plate 27. These recesses are generally triangular in their elevational views, FIGURE 2, and diverge in the direction of rotor rotation from their apices to their corresponding inlet ports. Such recesses may be provided alternatively in the plate 26 and are effective to reduce noise during operation.

In operation of the structure described, upon clockwise rotation of the rotor 20 in FIGURE 2, as the rollers 23 ride along cam 24 at the inlet sectors 47 and 47a of increasing radius, fluid is forced into the gradually expanding volume of the notches 22 unoccupied by the rollers 23 and is carried across the dwell arcs 46 and 46a of large constant cam radius and discharged under pressure through the ports 55', 56', and 55a', 56a' by virtue of the decreasing cam radius at the outlet arcs 48, 48a. The inlet arcs 47, 47a are separated from the adjacent discharge sectors 48, 48a by at least one roller 23 within each of the seal and dwell arcs 45, 45a, 46, 46a at all times. In this regard, a seal is effected at the engagement of each roller 23 with the cam arcs of constant radius, the outlet arcs of decreasing radius, much of the inlet arc of increasing radius, and the edges of the notch 22 as described below. By virtue of the construction described the extent of the seal arcs 45, 45a and dwell arcs 46, 46a spacing the inlet ports and discharge ports and the circumferential extent of the inlet and discharge ports can be readily dimensioned to minimize bypass leakage between the high and low pressure regions of the pump chamber 11 and to facilitate filling of the notches 22 at the regions of the inlet cam arcs whereby the problems of cavitation are minimized.

This latter function is aided by the unidirectional flow in inlet header 50 from its inlet 51 adjacent to the upstream inlet porting system at the inlet arc 47, i.e. the inlet ports 53, 53', 54, 54', to the diametrically opposed downstream inlet ports at the arc 47a in cooperation with the venturi action of the bypass duct 52 and the arrangement of the make-up bore 65 and flow directional biasing cam 68 described to effect a superior supercharging of the make-up fluid into inlet 51. Also the wrap around reservoir shell 91 enables the provision of a short low resistance make-up duct 65 directly into the bypass bore 52 from the reservoir 66.

In further explanation of the pump operation, the notches 22 and rollers 23 at the positions a through f, FIGURE 2, will also be referred to herein as the notches or rollers a through f respectively. At the position shown, the roller a is leaving the outlet cam arc 48a of decreasing radius and is about to enter the seal cam arc 45a of constant radius. Roller a is thus uniformly subjected to high pressure fluid within its rotor notch 22 and has no fluid sealing function, although it is in contact with the trailing edge of its rotor notch 22 and arc 48a. It is also in fluid contact with unbalanced pressure within recess 56a, which urges roller a axially leftward in FIGURE 3. The clearance between the rotor 20 and surface of cam 24 at all locations conducts fluid into the space between rollers a and b to fill that space with high pressure fluid and urge roller b into fluid sealing engagement with both the cam surface of seal arc 45a and the leading edge of its notch 22 along axially extending lines of tangency, thereby to separate the low pressure fluid at inlet arc 47 from the high pressure fluid at outlet arc 48a.

Upon clockwise rotation of the rotor 20 approximately 2° in FIGURE 2, the rollers a and b will enter the seal and inlet arcs respectively. By reason of the contact of roller b with the leading edge of its notch 22, and the contact of roller a with the trailing edge of its notch 22, the roller b will enter the inlet arc 47 of increasing radius very slightly before the roller a enters the seal arc 45a of constant radius. Accordingly, the high pressure immediately behind or at the counterclockwise side of roller b will begin to decrease very gradually at first to avoid shock and roller instability and then at an accelerated rate as roller b continues to move radially outwardly along the inlet arc of increasing radius, which movement is enhanced by the residual high pressure in the notch b radially inwardly of the roller b. Also immediately before roller a enters the seal arc 45a, the trailing edge of its notch 22 seals off the high pressure fluid from the rotor balancing and roller biasing recess 56a'. Thus as the high pressure at the counterclockwise side of roller b decreases, roller a will be moved clockwise into sealing engagement with both the leading edge of its notch a and the seal cam surface 45a, thereby to assume the sealing function of roller b in FIGURE 2 as roller a moves along the seal arc 45a.

After roller b moves clockwise about 10° along the inlet arc 47 toward the central region of the latter whereat the rate of increase of radius is most rapid and where-at the difficulty of maintaining the roller in sealing con-tact with the inlet arc is most serious, i.e. about a fifth or sixth of the length of the inlet arc, the leading edge of notch b will intersect the leading ends of the inner inlet ports 45a and 54a'. By this time, the pressure in notch b will have been gradually reduced to the pressure of the in-et fluid entering from the radially outer inlet ports 53 and 53' and leaking counterclockwise via the clearance between rotor 20 and inlet arc 47, so that roller b will have lost its sealing function (now assumed by roller a) and will have been moved into driven engagement with the trailing edge of its notch 22.

By virtue of the aforesaid restriction afforded by the outer inlet ports 53' and 53 with respect to the inner inlet ports 54' and 54, the opening of the latter ports into the notch b will establish a radially outwardly directed pres-sure force on roller b, assisting the latter's centrifugally urged radial outward movement and maintaining it posi-tively in engagement with the inlet cam surface 47 at all times. After moving approximately 20° along the inlet arc 47, or for more than one-third of its distance and almost to the position of roller c, the sealing engagement between the cam surface and roller b intersects the outer inlet ports 53 and 53', whereby the roller b will then as-sume the positions of rollers c and d in turn and the cavity between the surface of cam 24 and rotor 20 from roller b to roller e will be completely filled with the inlet fluid. Also the opening of the inner ports 54 and 54' into the notch b assures that the roller b will be in said driven engagement with the trailing edge of its notch b. By vir-tue of delaying direct opening of the notch b into com-munication with inner inlet ports 54 and 54' until after the roller b has moved along approximately one-fifth of the length of the inlet arc, and by further delaying the opening of the outer inlet ports 53 and 53' into the rotor notch 22 at the counterclockwise side of roller b, rapid decompression of the notch b and consequent noise are avoided without recourse to the customary decompres-sion notches.

As the roller d moves toward the position of roller e, the roller seal at the cam surface 24 will cut off the outer inlet ports 53 and 53' slightly before the trailing edge of the notch d cuts off the inner inlet ports 54 and 54'. Simultaneously or slightly later the leading edge of the latter notch will intersect the leading tip of the compres-sion recess or notch 104. This will occur after the roller d has moved several degrees, i.e. approximately 5°, along the dwell arc 46 of constant radius to assure complete filling of the space on the counterclockwise side of roller e. On continued clockwise movement of roller d, the space between the same and roller e will gradually attain the high pressure of the outlet ports and roller d will assume the sealing function of roller e to separate the high pres-sure at the outlet arc 48 from the low pressure at the inlet arc 47. By virtue of the foregoing, cavitation and noise during the inlet operation of the pump are substan-tially avoided.

The high pressure fluid discharged within the header 36 reacts against and holds the pressure plate 27 in seal-ing engagement with the cam ring 25, the latter in turn being urged in sealing engagement against the front plate 26 which is thus urged in sealing engagement against the base wall 11a, all with a force which is proportioned to the pump discharge pressure. Accordingly leakage from the high pressure outlet arc regions 48, 48a radially to-ward shaft 15 and circumferentially toward the low pres-sure inlet arcs 47, 47a is substantially eliminated. Fluid that does leak through the high resistance leakage paths provided, as for example to the inside of seal 18, will be at low pressure and is returned to reservoir 66 or the fluid inlet system as explained above.

We claim:

1. In a hydraulic pump, (1) a housing having a rotor chamber therein, (2) a rotor rotatable within said chamber, (3) fluid inlet and outlet port means in communica-tion with said chamber, (4) an out-of-round cam surface defining the periph-ery of said rotor chamber and comprising a succes-sion of arcs in the order described with respect to the direction of rotor rotation including (a) a seal arc of constant radius, (b) an inlet arc having a portion of increasing radius in said direction of rotation, (c) a dwell arc of constant radius, and (d) an outlet arc having a portion of decreasing radius in said direction of rotation, (5) means for supplying hydraulic inlet fluid under in-let pressure to said inlet port means, (6) means for pumping fluid from said inlet port means to said outlet port means upon rotation of said rotor comprising (a) a plurality of radially outwardly opening and circumferentially spaced notches in the periph-ery of said rotor, and (b) a corresponding plurality of pumping ele-ments freely movable radially in said notches respectively and carried thereby to follow the contour of said cam surface in fluid sealing en-gagement upon rotation of said rotor, (7) and means for effecting a radially outwardly di-rected resultant pressure force on said pumping ele-ments as the latter are carried along said inlet arc by rotation of said rotor, thereby to assist contrifugal force urging said pumping elements radially outward-ly against said cam surface, comprising (a) a restricted radially outer inlet port of said inlet port means for supplying said inlet fluid at reduced pressure less than said inlet pressure into said notches at locations radially outwardly of portions of said pumping elements within said inlet arc, [and]

(b) a radially inner inlet port of said inlet port means for supplying said inlet fluid at a pres-sure greater than said reduced pressure into said notches at locations radially inwardly of portions of said pumping elements within said inlet arc[.] , (c) *the rate of increasing radius for said inlet arc being a maximum near its mid-region and a minimum in the region near its terminals, the latter merging tangentially with said seal and dwell arcs respectively, and*

(d) *said radially outer inlet port being located for intersection by the location of sealing engage-ment of each roller in turn with said inlet arc only after that roller is carried by rotation of said rotor appreciably along the region of mini-mun rate of increasing radius for the latter arc from the terminal thereof adjacent said seal arc.*

2. In the combination according to claim 1, said pump comprising a balanced pump, said cam surface compris-ing a second succession of arcs like the first named suc-cession of arcs and diametrically opposing the same, and second parts associated with aid second succession of arcs in the manner that the corresponding first name parts are associated with said first named succession of arcs comprising (a) second fluid inlet and outlet port means, (b) second means for supplying hydraulic inlet fluid to said second inlet port means, and (c) second means for effecting a second radially out-wardly directed pressure force on said pumping ele-ments as the latter are carried along the second inlet arc.

3. In a hydraulic pump according to claim 1, said notches extending axially of said rotor and said pumping elements comprising rollers extending axially within said notches.

4. In the combination according to claim 3, said notches opening axially of said rotor to receive said inlet fluid by axial flow, said housing including axially spaced rotor confining walls spaced by fluid sealing bearing clearance from axially opposite end portions of said rotor, said outer and inner inlet ports comprising radially spaced recesses in at least one of said walls and confronting the adjacent axial end of said rotor to supply said inlet fluid axially into said slots at said respective locations.

[5. In the combination according to claim 4, the rate of increasing radius for said inlet arc being a maximum near its mid-region and a minimum in the region near its terminals, the latter merging tangentially with said seal and dwell arcs respectively, and said radially outer inlet port being located for intersection by the location of sealing engagement of each roller in turn with said inlet arc only after that roller is carried by rotation of said rotor appreciably along the region of minimum rate of increasing radius for the latter arc from the terminal thereof adjacent said seal arc.]

6. In the combination according to claim [5] *4*, said pump comprising a balanced pump, said cam surface comprising a second succession of arcs like the first named succession of arcs and diametrically opposing the same, and second parts associated with said second succession of arcs in the manner that the corresponding first named parts are associated with said first named sucession of arcs comprising (a) second fluid inlet and outlet port means,
(b) second means for supplying hydraulic inlet fluid to said second inlet port means, and
(c) second means for effecting a second radially outwardly directed pressure force on said pumping elements as the latter are carried along the second inlet arc.

7. In the combination according to claim 6, said inlet arc extending circumferentially approximately 55°, and seal arc and the distance between the centers of juxtaposed rotor notches each extending circumferentially approximately 30°, and said location of sealing engagement first intersecting said outer inlet port at a location approximately 20° along said inlet arc from said terminal thereof adjacent said seal arc.

8. In the combination according to claim 7, the leading edge of each rotor notch first intersecting each of said inner inlet ports in turn at a location approximately 10° from said terminal of said inlet arc adjacent said seal arc.

9. In the combination according to claim 6, said location of sealing engagement first intersecting said outer inlet port at a location approximately one-third of the circumferential extent of said inlet arc from its terminal adjacent said seal arc.

10. In the combination according to claim 9, the leading edge of each rotor notch first intersecting each of said inner inlet ports in turn at a location whereat the roller in that notch is carried along the associated inlet arc approximately one half the arcuate extent of the latter arc from said terminal thereof to the intersection of said outer inlet port by the location of sealing engagement between the latter roller and sealing arc.

11. In the combination according to claim 6, the leading edge of each rotor notch first intersecting each of said inner inlet ports in turn appreciably before the location of sealing engagement between the roller carried by that notch and the associated sealing arc intersects said outer inlet port.

12. In the combination according to claim 11, the location of intersection between the leading edges of the rotor notches and inner inlet ports in each case being also appreciably beyond the location at which the roller within the associated notch first engages the inlet arc.

13. In the combination according to claim 6, said location of sealing engagement first intersecting said outer inlet port at a location within the region of maximum rate of increasing radius of said inlet arc.

14. In the combination according to claim 13, the leading edge of each rotor notch first intersecting each of said inner inlet ports in turn before the location of intersection between said inlet arc and the roller carried by that notch [and said inlet arc] enters said region of maximum rate of increasing radius.

15. In a hydraulic pump, (1) a housing having a rotor chamber therein,
(2) a rotor rotatable within said chamber,
(3) fluid inlet and outlet port means in communication with said chamber,
(4) an out-of-round cam surface defining the periphery of said rotor chamber and comprising a succession of arcs in the order described with respect to the direction of rotor rotation including
  (a) a seal arc of constant radius,
  (b) an inlet arc having a portion of increasing radius in said direction of rotation,
  (c) a dwell arc of constant radius, and
  (d) an outlet arc having a portion of decreasing radius in said direction of rotation,
  (e) the rate of increasing radius for said arc portion of increasing radius being a maximum near its mid-region and a minimum in the region near its terminals,
    (1) the latter merging tangentially with said seal and dwell arcs respectively,
(5) means for pumping fluid from said inlet port means to said outlet port means upon rotation of said rotor comprising
  (a) a plurality of radially outwardly opening and circumferentially spaced notches in the periphery of said rotor, and
  (b) a corresponding plurality of pumping elements freely movable radially in said notches respectively and carried thereby to follow the contour of said cam surface in fluid sealing engagement upon rotation of said rotor,
  (c) said inlet port means being located for intersection by the location of sealing engagement of each sealing element in turn with said arc portion of increasing radius only after that sealing element is carried by rotation of said rotor appreciably along the region of minimum rate of increasing radius for the latter arc portion from the terminal thereof adjacent said sealing arc.

16. In the combination according to claim 15, said appreciable distance being greater than 10° of arc.

17. In the combination according to claim 15, said slots extending axially of said rotor and opening axially thereof, said inlet port means communicating only axially with said notches to supply inlet fluid axially thereto in turn upon rotation of said rotor, said pumping elements comprising rollers extending axially within said slots.

18. In the combination according to claim 17, said pump comprising a balanced pump, said cam surface comprising a second succession of arcs like said first named succession of arcs and diametrically opposing the same, said inlet port means including first and second inlet port means associated respectively with the inlet arcs of said first named and second successions of arcs, and located for intersection by the axial line of sealing engagement of each roller in turn with the associated inlet arc of increasing radius only after that roller is carried by rotation of said rotor appreciably along the associated region of minimum rate of increasing radius from the terminal of the latter arc adjacent the associated sealing arc, said outlet port means including first and second outlet port means associated respectively with the outlet arcs of said first named and second succession of arcs.

19. In the combination according to claim 18, each of said first and second inlet port means comprising a radially outer inlet port and a radially inner inlet port, the leading edge of each notch intersecting each inner inlet port in turn only after the location of sealing engagement between the associated inlet arc and roller within that notch is carried appreciably along said associated inlet arc, and said location of sealing engagement intersecting each outer inlet port in turn only after said location of sealing engagement is carried along the associated inlet arc appreciably beyond the region whereat said leading edge intersects the inner inlet port.

20. In a hydraulic pump, (A) a housing having
  (1) a rotor chamber therein,
  (2) the periphery of said chamber defining a cam surface, (B) a rotor rotatable within said chamber, (C) said housing including rotor confining walls spaced axially by said rotor,
  (1) each of said walls being spaced by fluid sealing bearing clearance from the axially adjacent end portion of said rotor, (D) fluid inlet and outlet port means in communication with said chamber at circumferentially spaced locations,
  (1) said outlet port means comprising a recess in each of said walls paired with an axially opposed recess in the other wall,
  (2) the paired recesses having substantially equal effective areas axially confronting the adjacent rotor end portions for balancing the axially directed outer fluid pressure force on said rotor, (E) means cooperable with said cam surface for pumping fluid from said inlet port means to said outlet port means upon rotation of said rotor comprising
  (1) a plurality of radially outwardly opening and circumferentially spaced *slots* [notches] in the periphery of said rotor, and
  (2) a corresponding plurality of pumping rollers freely movable radially in said slots respectively and carried thereby to follow the contour of said cam surface in fluid sealing engagement upon said rotation,
  (3) said slots extending axially of said rotor and opening axially thereof,
  (4) one of said recesses having a roller biasing portion extending beyond the area of the paired recess and confronting axial end portions of said rollers to effect an unbalanced axially directed pressure force on said rollers in turn as the latter are carried by rotation of said rotor across said roller biasing recess portion.

(F) said outlet port means communicating only axially with said *slots* [notches] to receive outlet fluid axially therefrom in turn upon rotation of said rotor.

21. In the combination according to claim 20, said pump comprising a balanced pump wherein each inlet port means comprises a pair of diametrically opposed inlet port means and each outlet port means comprises a pair of diametrically opposed outlet port means.

22. In the combination according to claim 21, said cam surface comprising two succession of arcs, each including in the order described with respect to the direction of rotation (a) a seal arc of constant radius,
(b) an inlet arc *having a portion* of increasing radius,
(c) a dwell arc of constant radius, and
(d) an outlet arc *having a portion* of decreasing radius, [the two pairs of arc portions in] *each arc portion in one of* the two successions being diametrically opposed [and each pair being within the limits of arc defined by one of each of the outlet arcs,] *to the corresponding arc portion in the other of the two successions,* and each roller biasing portion extending in the direction of rotation beyond the paired and axially opposed recess *and being within the limits of arc defined by its associated outlet arc.*

23. In the combination according to claim 22, each roller biasing portion confronting the axial end portion of the rollers moving along the latter third of the associated outlet arc, measured in the direction of rotation.

References Cited

The following references, cited by the Examiner, are of record in the patented file of this patent or the original patent.

UNITED STATES PATENTS

| | | | |
|---|---|---|---|
| 1,749,058 | 3/1930 | Barlow | 103—136 A |
| 1,749,121 | 3/1930 | Barlow | 103—136 A |
| 2,255,781 | 9/1941 | Kendrick | 103—136 RI |
| 2,411,602 | 11/1946 | Tweedale | 103—136 RI |
| 2,826,179 | 3/1958 | Klessig et al. | 91—138 |
| 3,025,802 | 3/1962 | Browne | 103—136 A |
| 3,072,067 | 1/1963 | Beller | 103—136 RI |
| 3,236,566 | 2/1966 | Halsey | 103—136 A |
| 3,247,803 | 4/1966 | Halsey | 103—136 |
| 3,359,913 | 12/1967 | Halsey | 103—136 |

CARLTON R. CROYLE, Primary Examiner

W. J. GOODLIN, Assistant Examiner

U.S. Cl. X.R.

418—268